(12) United States Patent
Itoh

(10) Patent No.: US 6,256,990 B1
(45) Date of Patent: Jul. 10, 2001

(54) EXHAUST MANIFOLD INTEGRALLY CAST WITH TURBINE HOUSING FOR TURBOCHARGER

(75) Inventor: Kenji Itoh, Tochigi-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/474,006

(22) Filed: Dec. 28, 1999

(30) Foreign Application Priority Data

Dec. 28, 1998 (JP) ................................................ 10-374104

(51) Int. Cl.⁷ ........................................................ F01N 7/10
(52) U.S. Cl. .................................................. 60/597; 60/323
(58) Field of Search ............................ 60/323, 597, 602, 60/605.1

(56) References Cited

U.S. PATENT DOCUMENTS

| | | | |
|---|---|---|---|
| 3,557,549 | * | 1/1971 | Webster .................................. 60/602 |
| 3,948,052 | * | 4/1976 | Merkle et al. ...................... 60/605.1 |
| 4,294,073 | * | 10/1981 | Neff ........................................ 60/597 |
| 6,062,024 | * | 5/2000 | Zander et al. ........................... 60/323 |

FOREIGN PATENT DOCUMENTS 8319827  12/1996  (JP) .

OTHER PUBLICATIONS

"Sokeizai" published by the Sokeizai Center Foundation on Jan. 20, 1998, p. 2 with abridged translation, "Exhaust Manifold Integral with Heat Resistant Turbine Housing".

* cited by examiner

*Primary Examiner*—Michael Koczo
(74) *Attorney, Agent, or Firm*—Sughrue, Mion, Zinn, Macpeak & Seas, PLLC

(57) ABSTRACT

An exhaust manifold integrally cast with a turbine housing for a turbocharger has pipe portions having exhaust gas flow paths and a plurality of ports adapted to receive an exhaust gas; flanges respectively extending from the ports; a converged portion connected to the pipe portions and adapted to converge the exhaust gas flow paths in the pipe portions; and a turbine housing integrally connected to the converged portion and having a circular exhaust gas flow path therein. The exhaust gas flow path in the converged portion is in a tangent direction relative to the circular exhaust gas flow path in the turbine housing. A neck portion that connects an outer surface of the turbine housing to an outer surface of the converged portion at a particular angle has a radius of curvature that is relative to the distance in a tangent direction of the exhaust gas flow path from the center of the turbine housing to the converged portion. Namely, the ratio of the radius of the curvature to the distance in the tangent direction of the exhaust gas flow path from the center of the turbine housing to the converged portion is 0.13 or more.

7 Claims, 7 Drawing Sheets

Tangential Distance L (mm) of Exhaust Gas Flow Path
From Center of Turbine Housing to Converged Portion ● : No cracks in neck portion.
▲ : Fine cracks on surface of neck portion.
✗ : Cracks penetrating neck portion into exhaust gas flow path.

EXHAUST MANIFOLD INTEGRALLY CAST WITH TURBINE HOUSING FOR TURBOCHARGER

FIELD OF THE INVENTION

The present invention relates to an exhaust manifold integrally cast with a turbine housing for turbocharger.

DESCRIPTION OF PRIOR ART

Automobile engines are recently equipped with turbochargers to increase their power. The turbochargers make larger engines unnecessary, resulting in reduction in the automobiles size and the amount of an exhaust gas per unit work done. Because the turbochargers provide engines with high air/fuel ratios, it is highly expected to reduce air-polluting materials such as NOx and particulate matters in the exhaust gas.

For the purpose of preventing global warming and reducing the consumption of fossil fuel, demand is increasingly mounting to improve the fuel efficiency of automobiles. Because turbochargers serve to generate large horsepower with small fuel consumption, wasteful energy for overcoming friction pressure that increases as the displacement of engines increases can be reduced, thereby contributing to improvement in fuel efficiency.

In general, a turbocharger mounted to automobiles, etc. has a structure utilizing energy of a high-temperature, high-pressure exhaust gas guided through a manifold connected to outlets of an engine to rotate a rotor at a high speed, thereby rotating a compressor concentric with the rotor to increase the pressure of intake gas to the engine. The rotor is rotatably disposed in a turbine chamber of the turbine housing, which comprises an exhaust gas flow path for introducing the exhaust gas into a rotor chamber.

However, to mount both an exhaust manifold and a turbocharger in a limited space of an engine room in an automobile, it is important to determine the optimum shapes and sizes of these parts. Particularly when a turbine housing-integrated exhaust manifold is disposed in an automobile having the existing structure, a turbine housing cannot be mounted to the existing exhaust manifold without modifications of design. Accordingly, the exhaust manifold should be optimized in shape and size, so that it matches the turbine housing that is to be connected to the exhaust manifold.

Promising means for coping with this problem are exhaust parts obtained by integrally casting an exhaust manifold and a turbine housing, and their development has been carried out rapidly. Casting turbine housings integrally with exhaust manifolds provides exhaust parts without connections, thereby reducing the number of parts, and thus reducing assembling cost and making exhaust manifolds compact. Because there is no need for space for assembling these parts, the manifolds have high freedom of design, making it possible to provide the exhaust manifolds with the most ideal design. For instance, with respect to heat-resistant turbine housing-integrated exhaust manifolds, "Sokeizai," published by the Sokeizai Center Foundation on Jan. 20, 1998, page 2 describes that 10 parts can be eliminated, that connections at 4 points are made unnecessary, and that the integration of parts makes it possible to reduce the size of products.

When an exhaust manifold exposed to a high-temperature exhaust gas is integrated with a turbine housing subjected to large vibration, the resultant turbine housing-integrated exhaust manifold is subjected to both stress such as thermal stress and vibration and thus likely to be deformed and cracked when designed in the conventional way. Accordingly, it is difficult to design an exhaust manifold integral with a turbine housing for a turbocharger, which can be used without causing any problems for practical applications. The above thesis concerning the heat-resistant turbine housing-integrated exhaust manifolds in "Sokeizai" neither describes nor suggests the prevention of deformation and cracking when stress such as thermal stress and vibration is applied.

OBJECT AND SUMMARY OF THE INVENTION

Accordingly, an object of the present invention is to provide a small, long-life exhaust manifold integrally cast with a turbine housing for a turbocharger, which has a shape showing excellent strength to stress due to thermal stress by an exhaust gas and the vibration of a turbine housing.

As a result of research in view of the above object, the inventor has found that by optimizing the shape of a turbine housing-integrated exhaust manifold in a converged portion, particularly by optimizing a ratio of a radius of curvature in a neck portion via which the converged portion is connected to the turbine housing to a distance in a tangent direction from the center of the turbine housing to the exhaust gas flow path in the converged portion, the turbine housing-integrated exhaust manifold has excellent strength to mechanical stress due to the vibration of the turbine housing, thereby preventing the generation of cracks in and near the neck portion. The present invention has been completed based on this finding.

Thus, an exhaust manifold integrally cast with a turbine housing for a turbocharger according to the present invention comprises pipe portions having exhaust gas flow paths and a plurality of ports adapted to receive an exhaust gas; flanges respectively extending from the ports; a converged portion connected to the pipe portions and adapted to converge the exhaust gas flow paths in the pipe portions; and a turbine housing integrally connected to the converged portion and having a circular exhaust gas flow path therein, wherein the exhaust gas flow path in the converged portion is in a tangent direction relative to the circular exhaust gas flow path in the turbine housing, and wherein a neck portion that connects an outer surface of the turbine housing to an outer surface of the converged portion at a particular angle has a radius of curvature that is relative to the distance in a tangent direction of the exhaust gas flow path from the center of the turbine housing to the converged portion. Namely, the ratio of the radius of curvature to the distance in the tangent direction of the exhaust gas flow path from the center of the turbine housing to the converged portion is 0.13 or more.

Preferably, the ratio of the radius of curvature in the neck portion to the distance in a tangent direction of the exhaust gas flow path from the center of the turbine housing to the converged portion is 0.23 or more.

In a preferred embodiment of the present invention, ribs are formed on outer surfaces of pipe portions and converged portion. The ribs increase the mechanical strength of the pipe portions and the converged portion, thereby preventing them from being cracked by thermal stress and vibration.

In another preferred embodiment of the present invention, the turbine housing is disposed at a position deviated from a centerline connecting centers of the ports. The pipe portions are integrally connected to each other to form a V-shaped portion on a centerline side of the converged portion, and the V-shaped portion has a wall portion that is thicker than other wall portions of the exhaust manifold. With this structure, the exhaust manifold is free from cracking in its converged portion, even though the converged portion is subjected to stress by thermal expansion and shrinkage of the exhaust manifold in a tangent direction.

In a further preferred embodiment of the present invention, the converged portion is provided on one side of the ports and the pipe portions are provided on an opposing side of the ports. With this structure, the lower surface of the converged portion is not in contact with or close to an engine case, whereby the temperature of the converged portion is not extremely lower in its lower portion than in its upper portion. Thus, it is not likely that thermal stress is generated in the converged portion.

In a still further preferred embodiment of the present invention, a pair of the ports located adjacent to the converged portion are surrounded by flanges having a bridge portion extending therebetween, and the bridge portion has a slit of 3 mm or less in width extending substantially perpendicular to a centerline of the pipe portions. This slit serves to absorb thermal shrinkage in a tangent direction of the pipe portions, thereby preventing an excessive load from being applied to the bolts fixing the exhaust manifold to the engine case.

DETAILED DESCRIPTION OF THE PREFERRED EMBODIMENTS

Figure 1:
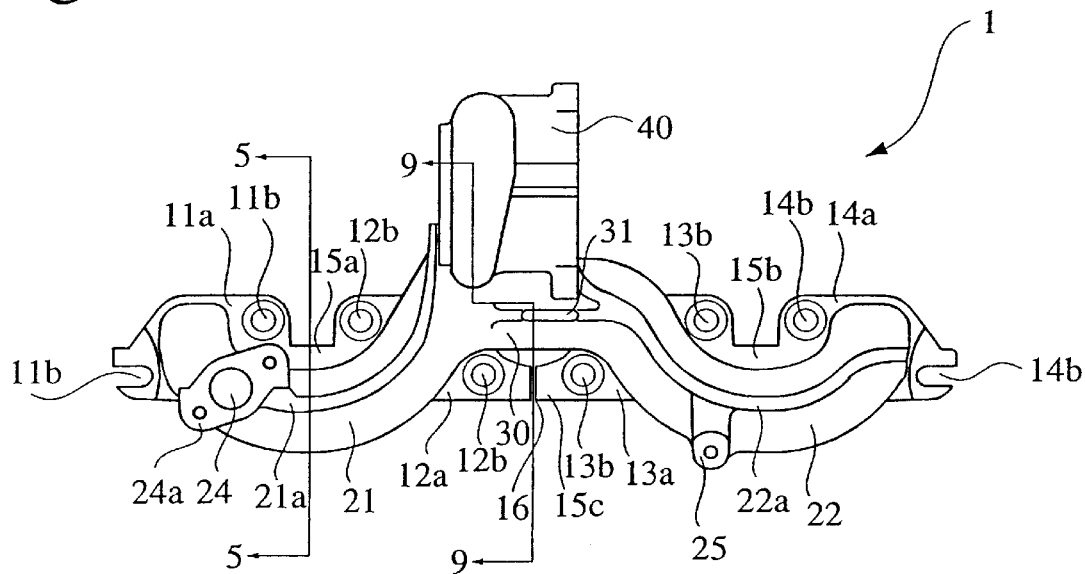
FIG. 1 is a front view showing a turbine housing-integrated exhaust manifold according to one embodiment of the present invention.

The exhaust manifold integrally cast with a turbine housing according to the present invention will be described in detail below referring to the drawings attached hereto.

Figure 2:
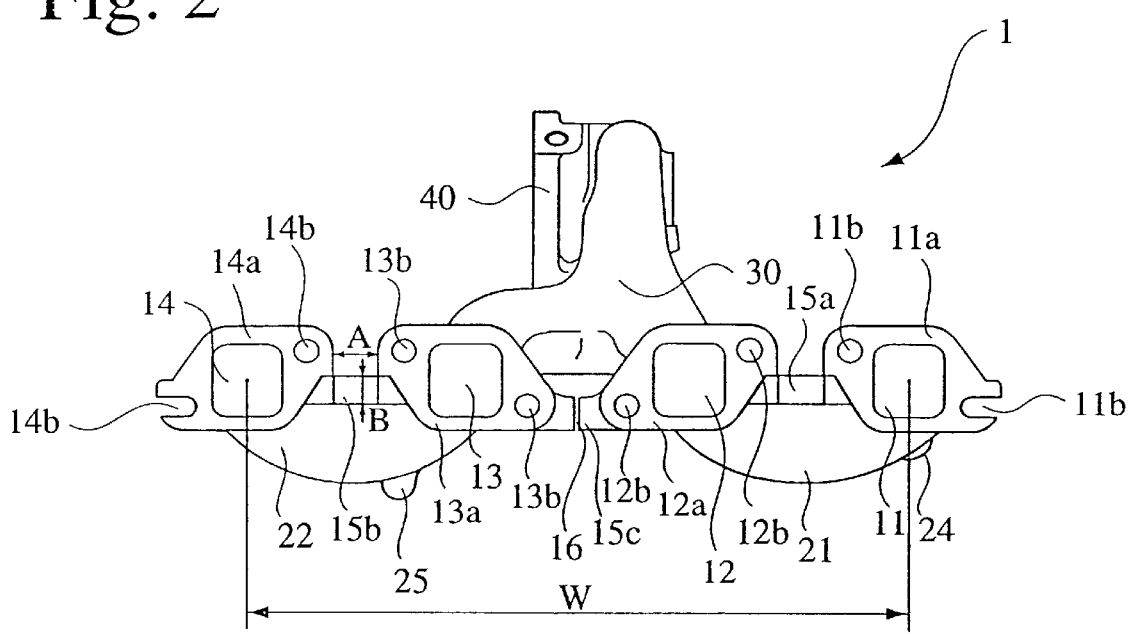
FIG. 2 is a rear view showing the turbine housing-integrated exhaust manifold of FIG. 1.
Figure 3:
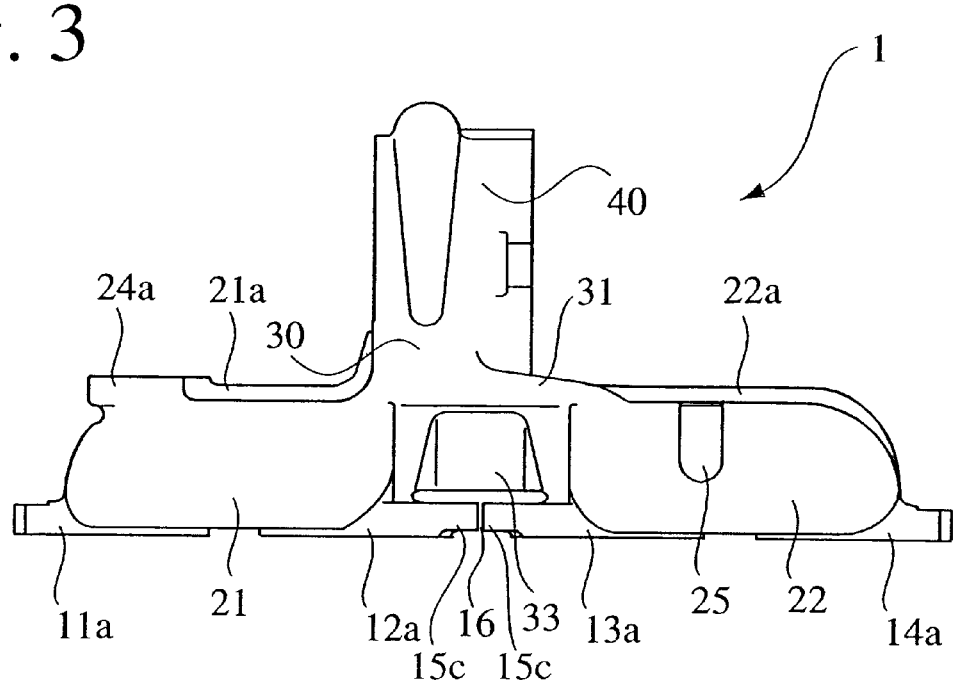
FIG. 3 is a bottom view showing the turbine housing-integrated exhaust manifold of FIG. 1.
Figure 4:
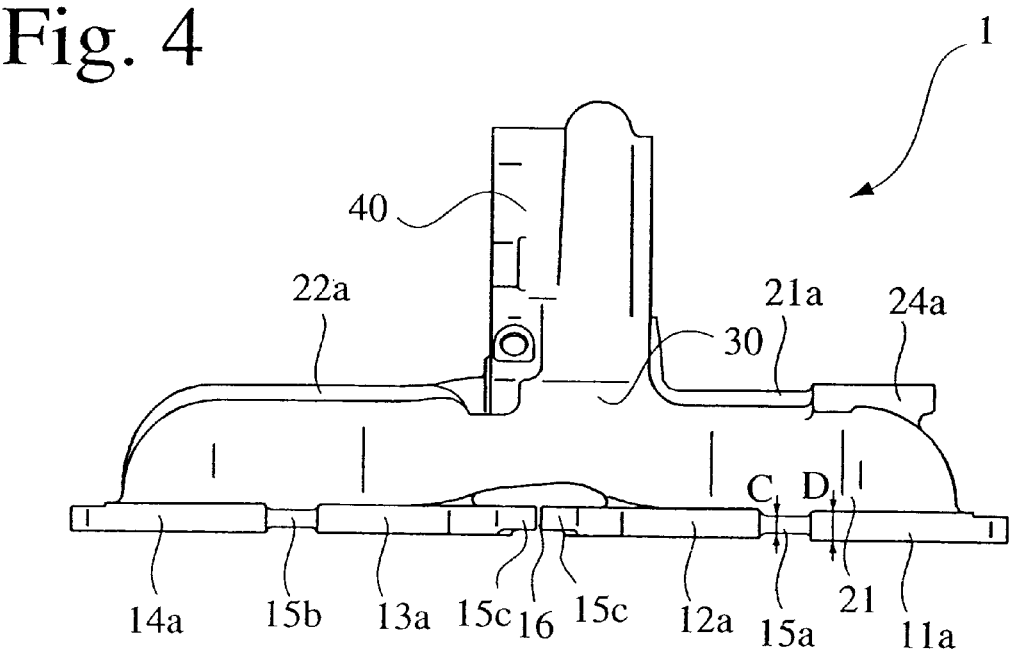
FIG. 4 is a plan view showing the turbine housing-integrated exhaust manifold of FIG. 1.
Figure 5:
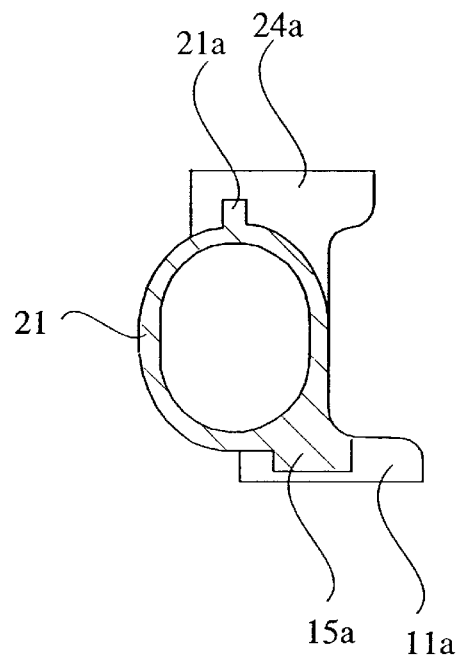
FIG. 5 is a cross-sectional view taken along the line 5—5 in FIG. 1.
Figure 6:
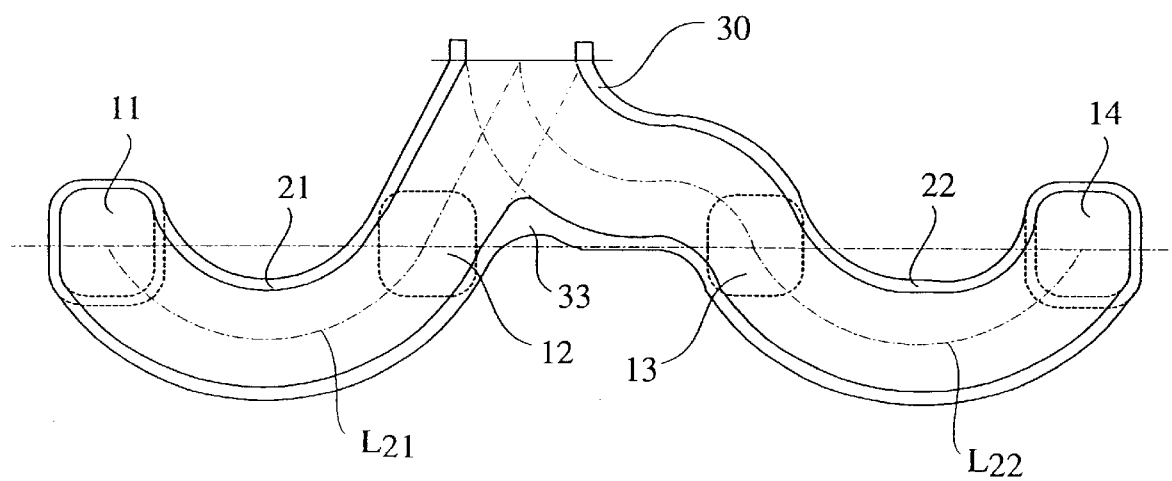
FIG. 6 is a transverse cross-sectional view showing pipe portions of the turbine housing-integrated exhaust manifold of FIG. 1.
Figure 7:
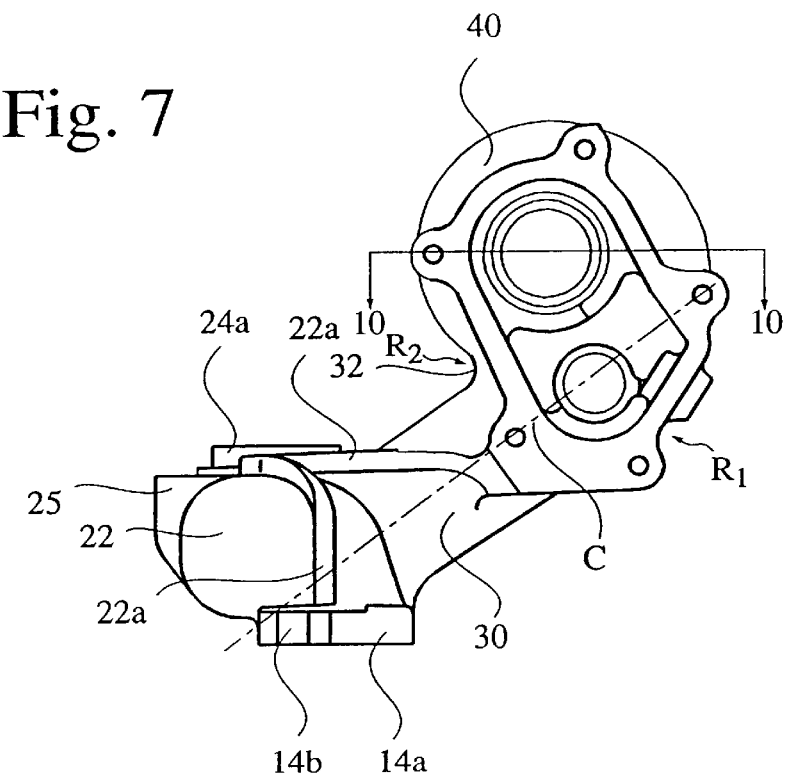
FIG. 7 is a right side view showing the turbine housing-integrated exhaust manifold of FIG. 1.
Figure 8:
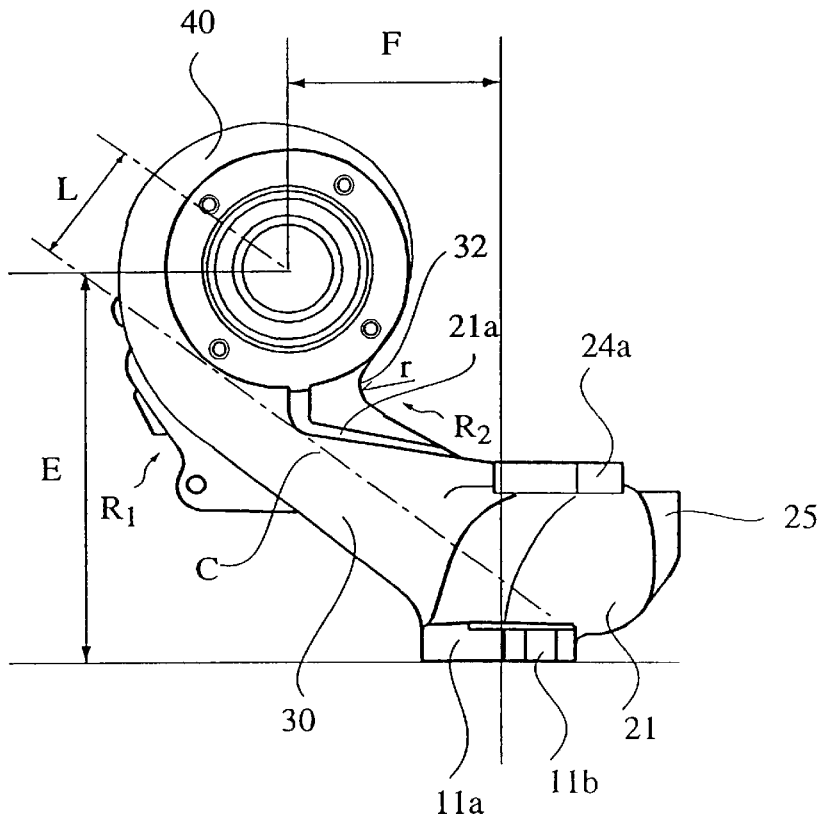
FIG. 8 is a left side view showing the turbine housing-integrated exhaust manifold of FIG. 1.

FIG. 1 is a front view of the turbine housing-integrated exhaust manifold 1 according to one embodiment of the present invention, FIG. 2 is its rear view, FIG. 3 is its bottom view, FIG. 5 is a cross-sectional view of FIG. 1, FIG. 6 is a transverse cross-sectional view of pipe portions of the turbine housing-integrated exhaust manifold, FIG. 7 is a right side view of the turbine housing-integrated exhaust manifold, and FIG. 8 is a left side view of the turbine housing/integrated exhaust manifold. These figures specifically illustrate an exhaust manifold 1 integrally cast with a turbine housing for an in-line, four-cylinder engine, though the present invention is not restricted thereto. In addition, though curved pipe portions are integral in the overall structure, they are assigned reference numerals 21, 22, because they are constituted by two parts converging together.

[1] Exhaust Gas-introducing Port

Figure 12:
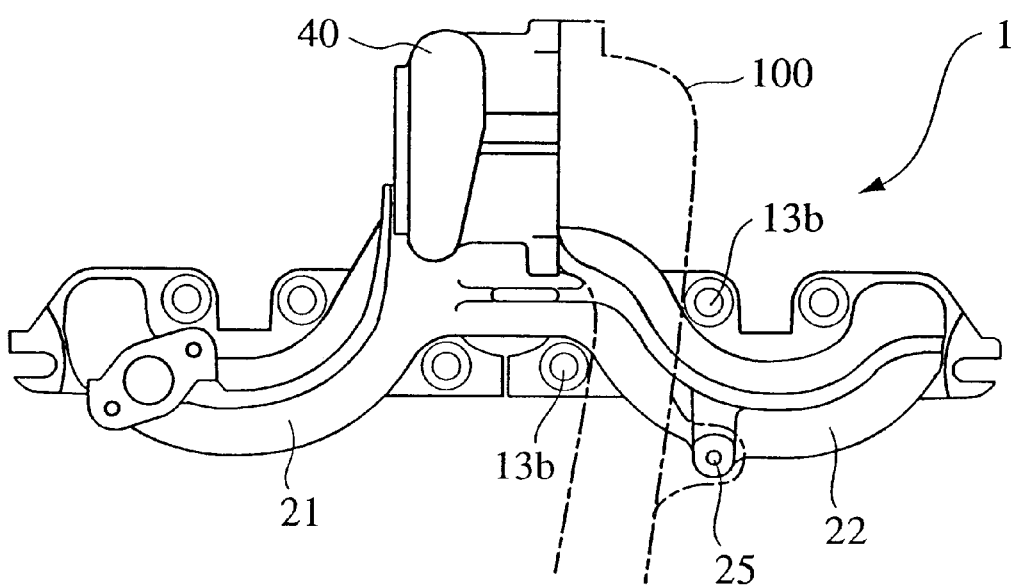
FIG. 12 is a front view showing the turbine housing-integrated exhaust manifold of FIG. 1 having an exhaust pipe fixed to the turbine housing.

As shown in FIG. 6, the ports 11–14 of the pipe portions 21, 22 are aligned substantially linearly, and a flange 11a–14a of each port 11–14 is provided with two through-holes 11b–14b into which bolts are inserted to fix the turbine housing-integrated exhaust manifold to an engine case. Among them, two through-holes 11b, 14b located on both ends have notches through which the notches are open. The through-holes 13b, 13b should be exposed vertically after an exhaust pipe 100 as shown by a broken line in FIG. 12 is fixed to a turbine housing 40, so that bolts can be fixed through the through-holes 13b, 13b to the engine case by an automatic machine.

There are bridge portions 15a, 15b between the adjacent flanges 11a and 12a, and between the adjacent flanges 13a and 14a. The distance A between the adjacent flanges 11a and 12a and the distance A between the adjacent flanges 13a and 14a are preferably 0.05 times or more the distance W between the centers of the outermost ports 11 and 14.

Provided between the flanges 12a and 13a is a bridge portion 15c having at center a slit 16 extending substantially perpendicular to the centerline of the pipe portions 21, 22. This slit 16 absorbs the displacement or deformation of the pipe portions 21, 22 due to their thermal expansion and shrinkage. The slit 16 preferably has a width equal to or smaller than the shrinkage of the pipe portions, specifically 3 mm or less. With this size of the slit width, the inner surfaces of the slit 16 come into contact with each other when the shrinkage of the pipe portions 21, 22 increases to a certain level, so that further shrinkage stress is born by the bridge portion 15c. As a result, excessively large load is not applied to bolts connecting the exhaust manifold 1 to the engine case.

[2] Pipe Portions

As shown in FIGS. 1 and 6, the pipe portion 21 integrally connected to the pipe portion 22 extends from a port 11 to the converged portion 30 via a port 12, and the pipe portion 22 extends from a port 14 to the converged portion 30 via a port 13. Both pipe portions 21, 22 are connected to each other in the converged portion 30 such that exhaust gas flow paths smoothly converge therein, and then connected to the turbine housing 40. Provided in the middle of the pipe portion 21 is a port 24 integrally surrounded by an EGR flange 24a for returning the exhaust gas to a cylinder head. A boss 25 for mounting an exhaust pipe is disposed on the pipe portion 22 near the flange 13a.

As shown in FIG. 5, which is a cross-sectional view of FIG. 1, an inner cross section of the pipe portion 21 is substantially elliptic between the ports 11 and 12, and its cross sectional area is slightly larger than that of the port 11. After passing through the port 12, the exhaust gas flow path in the pipe portion 21 gradually changes to a completely circular shape. The same is true of the pipe portion 22. An inner cross section of the pipe portion 22 is substantially elliptic between the ports 13 and 14, and the exhaust gas flow path in the pipe portion 22 gradually changes to a completely circular shape after passing through the port 13.

As shown in FIG. 6, both centerlines $L_{21}$, $L_{22}$ of the pipe portions 21, 22 are preferably smooth curves each having a radius of curvature of at least 55 mm. With the smoothly curved exhaust gas flow paths having a radius of curvature of 55 mm or more in both pipe portions 21, 22, the exhaust gas can smoothly flow with minimized energy loss while avoiding the concentration of thermal stress.

Each pipe portion 21, 22 has a rib 21a, 22a substantially along a highest contour line on its outer surface, and the converged portion 30 has a rib 31 along a line connecting the ribs 21a and 22a on its outer surface. Thus, ribs 21a, 22a and 31 are substantially most distant from the flanges 11a–14a. The rib 21a extends from the EGR flange 24a to the turbine housing 40 via the converged portion 30. Also, the rib 22a extends from one end of the pipe portion 22 to the turbine housing 40 via the converged portion 30, and converges with the rib 31 near the turbine housing 40. With the ribs formed on the pipe portions 21, 22 and the converged portion 30, the exhaust manifold can withstand the difference in thermal expansion and shrinkage and thus thermal stress between upper portions and lower portions thereof.

[3] Converged Portion

Because the converged portion 30 is subjected to load and vibration of the turbine housing 40 and the turbocharger therein, the converged portion 30 is preferably 1.2–2.0 times as thick as the pipe portions 21, 22. Further, because the bending moment due to the load of the turbocharger is in proportion to the distance between the flanges 11a–14a and the center axis of the rotor shaft (center of gravity of the turbocharger), the converged portion 30 preferably has a thickness gradually increasing from a portion 30a on the side of the turbine housing 40 to a portion 30b on the side of the exhaust gas-introducing port. With gradient in the thickness of the converged portion 30, the exhaust manifold can withstand increased torque.

As shown in FIGS. 7 and 8, the turbine housing 40 is integrally connected to the converged portion 30, such that the direction of a circular exhaust gas flow path in the turbine housing 40 is tangential to that of a centerline C of the exhaust gas flow path in the converged portion 30. Therefore, there are a region $R_1$ in which an outer surface of the turbine housing 40 is substantially in tangential connection to an outer surface of the converged portion 30, and a region $R_2$ in which an outer surface of the turbine housing 40 intersects with an outer surface of the converged portion 30 at a particular angle such as about 90°. In the region $R_2$, a neck portion 32 in which an outer surface of the turbine housing 40 is directly connected to an outer surface of the turbine housing 40 is most subjected to stress due to the vibration of the turbocharger. Accordingly, if the neck portion 32 does not have an appropriate radius of curvature relative to the distance of the exhaust gas flow path in a tangent direction between the center of the turbine housing 40 and the converged portion 30, cracks may appear in or near the neck portion 32.

To cope with this problem, the neck portion 32 preferably has a radius of curvature of 6 mm or more, more preferably 15 mm or more. In general, the radius of curvature of the neck portion 32 is in proportion to the size of the turbine housing 40 above the neck portion 32. Namely, a ratio of the radius of curvature (r) of the neck portion 32 to the distance L in a tangent direction of the exhaust gas flow path from the center of the turbine housing 40 to a centerline of the converged portion 30 is 0.13 or more, preferably 0.23 or more. When this ratio (r:L) is less than 0.13, stress is concentrated in the neck portion 32 by vibration, likely resulting in cracks penetrating through the exhaust gas flow path. To increase the radius of curvature (r) of the neck portion 32, the neck portion 32 is preferably made thicker such that the neck portion 32 has a smooth outer surface.

Figure 9:
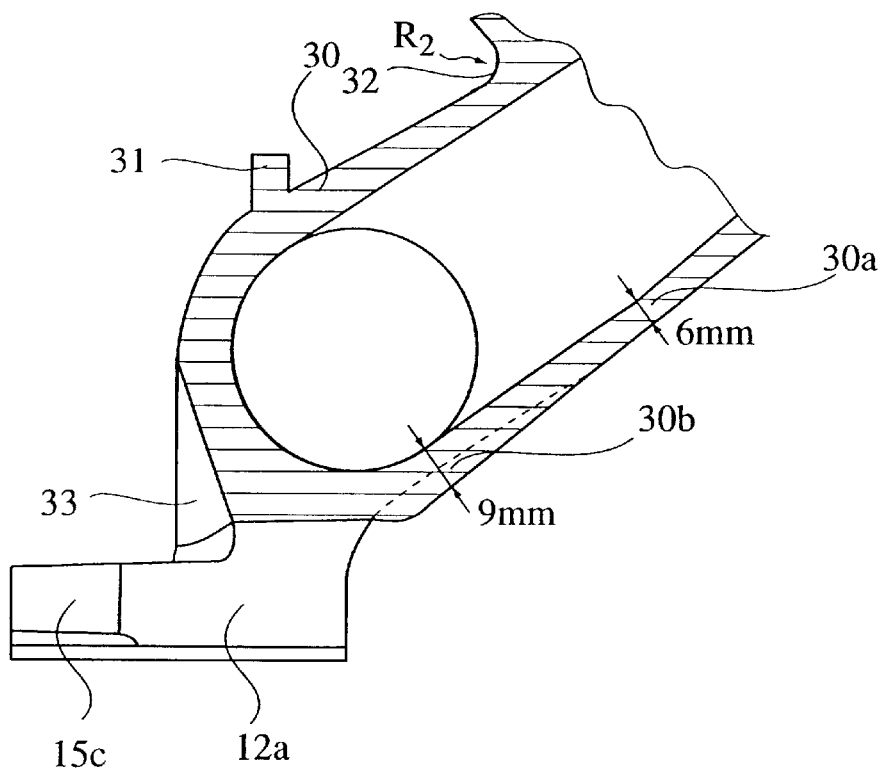
FIG. 9 is a partial cross-sectional view taken along the line 9—9 in FIG. 1.

In a lower portion of the converged portion 30, namely in a portion of the exhaust manifold facing the bridge portion 15 connecting the flanges 12a and 13a, the pipe portions 21 and 22 are integrally connected to each other to form a V-shaped portion. Because there is provided a slit 16 in the bridge portion 15c under the converged portion 30, the stress is concentrated in the V-shaped portion 33 of the converged portion 30. Accordingly, the V-shaped portion 33 has a wall portion that is preferably thicker than other wall portions of the converged portion 30. Specifically, the V-shaped portion 33 is preferably as thick as 6–12 mm, 1.5–3.0 times that of the pipe portions. As shown in FIG. 9, with the thick V-shaped portion 33, the exhaust manifold can withstand stress applied to the lower portion of the converged portion 30, even though there is a slit 16 in the bridge portion 15c.

[4] Turbine Housing

Figure 10:
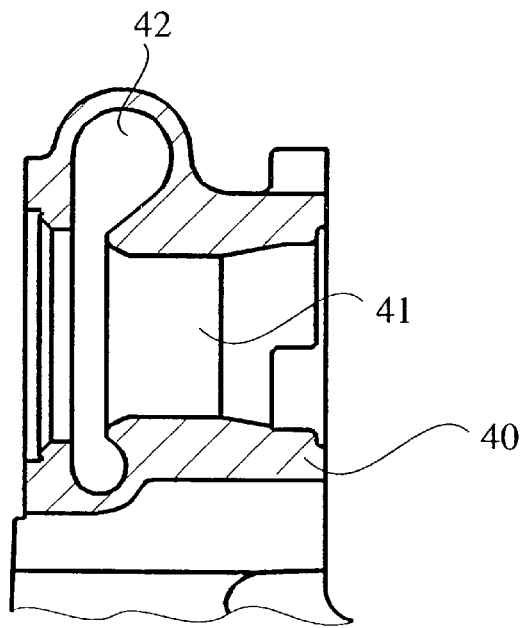
FIG. 10 is a cross-sectional view taken along the line 10—10 in FIG. 7.

The turbine housing 40 is usually a housing for a radial turbine, and 20 has a rotor chamber 41 and an exhaust gas-introducing port 42 as shown in FIG. 10. The turbine housing 40 has a circular exhaust gas flow path in a tangent direction to the exhaust gas flow path substantially in the converged portion 30. Because the turbine housing 40 is integrally cast with the exhaust manifold 1, the turbine housing-integrated exhaust manifold of the present invention occupies only a small space. The turbine housing-integrated exhaust manifold of the present invention having such a structure is an integral casting of cast iron, cast steel, etc.

Though the turbine housing-integrated exhaust manifold of the present invention has been explained above referring to the drawings attached hereto, the present invention is not restricted thereto, with various modifications possible. Also, the turbine housing-integrated exhaust manifold may have various sizes by changing dimensions of its parts.

In the case of a large exhaust manifold, the entire pipe portion may be divided to three parts. Though three-part exhaust manifold per se is already know in the art, the present invention is applicable thereto by integrally casting a center pipe portion with a turbine housing.

The present invention will be described in detail referring to EXAMPLE below, without intention of restricting the scope of the present invention thereto.

EXAMPLE 1

High-Si, spheroidal graphite cast iron having a composition comprising 2.8–3.4 weight % of C, 3.75–4.5 weight % of Si, 0.6 weight % or less of Mn, 0.02 weight % or less of S, 0.08 weight % or less of P, 0.030 weight % or more of Mg, and 0.4–0.7 weight % of Mo was cast to provide a turbine housing-integrated exhaust manifold as shown in FIGS. 1–10, and then properly machined to have the following dimensions:

Distance W between centers of outermost ports: 400 mm,

Cross section of exhaust gas flow path in pipe portions; 46 $mm^2$,

Cross section of exhaust gas flow path in converged portion; 44 $mm^2$,

Vertical distance E from flange to center axis of rotor shaft; 162.5 mm, and

Horizontal distance F from flange to center axis of rotor shaft; 84 mm.

Figure 11:
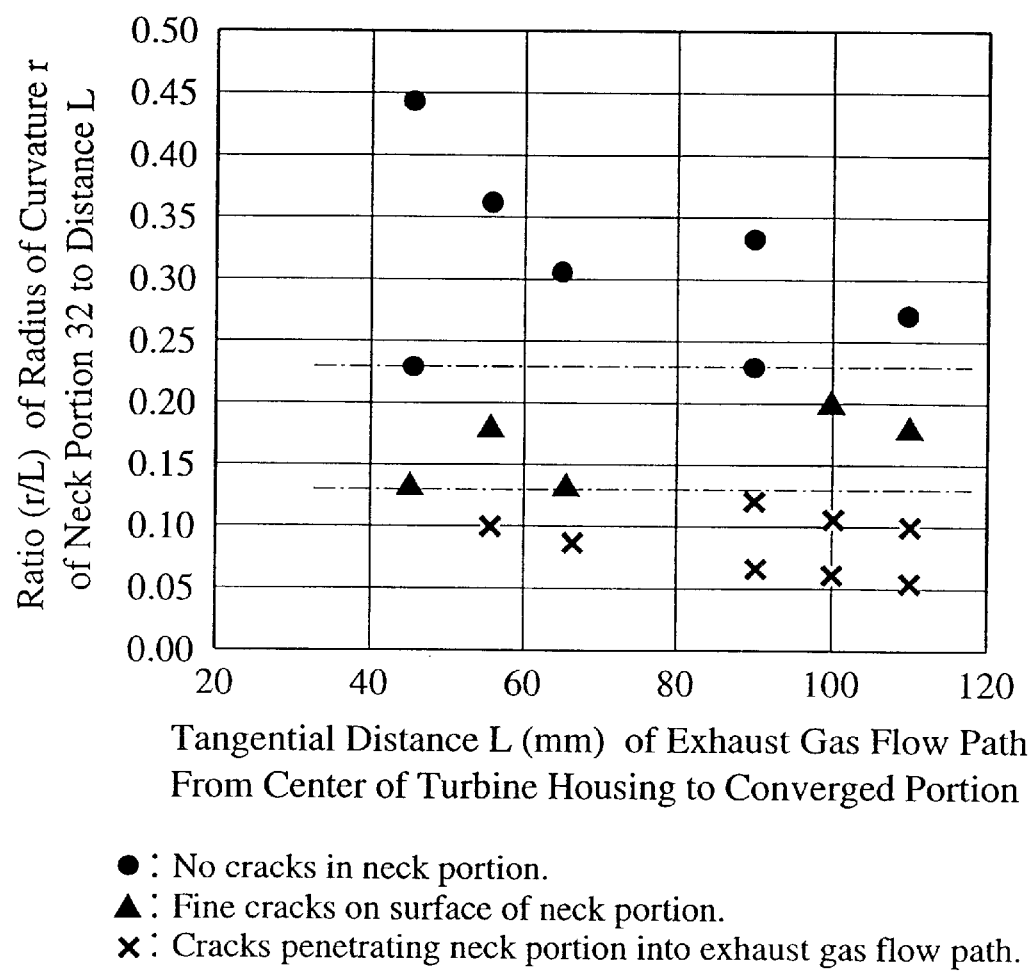
FIG. 11 is a graph showing the relation between a ratio (r/L) of a radius of curvature (r) in the neck portion to a tangential distance (L) and the degree of cracking.

With various tangential distance L of the exhaust gas flow path from the center axis of the turbine housing 40 to the converged portion 30, and with various ratios (r/L) of the radius of curvature (r) of the neck portion 32 to the tangential distance L, the turbine housing-integrated exhaust manifold was operated at 650–700° C. for 500 hours to examine whether or not cracks were generated in the neck portion 32. The results are shown in FIG. 11. In FIG. 11, ● indicates that there were no cracks in the neck portion 32, ▲ indicates that there were fine cracks on a surface of the neck portion, and × indicates that there were cracks penetrating the neck portion 32 into the exhaust gas flow path.

As is clear from FIG. 11, in the case of the tangential distance L of 55 mm, fine cracks were generated on a surface of the neck portion 32 when a ratio (r/L) of the radius of curvature (r) to the tangential distance L was 0.18. However, no problems were caused when the turbine housing-integrated exhaust manifold was operated with such fine cracks. In the case of L=65 mm, fine cracks were generated at r/L=0.13, though causing no problems. This means that when the ratio r/L is 0.13 or more, the turbine housing-integrated exhaust manifold can be used for practical purpose without causing any problems. Also, in the entire range of L=40 mm to 120 mm, no cracks were generated at r/L=0.23 or more. This means that the ratio r/L is preferably 0.23 or more.

As described above, in the turbine housing-integrated exhaust manifold of the present invention, a neck portion in which the converged portion is directly connected to the turbine housing has a suitable radius of curvature relative to the tangential distance of the exhaust gas flow path from the center of the turbine housing to the converged portion, resulting in no cracking even though stress is repeatedly applied to by the vibration of the turbine.

Because the turbine housing-integrated exhaust manifold has ribs on the pipe portions and the converged portion, no cracks are generated in the pipe portions and converged portion of the exhaust manifold under the conditions that it is repeatedly subjected to thermal stress due to difference in thermal expansion between the upper and lower portions of the exhaust manifold. Further, with the converged portion having a gradually increasing thickness, it has enough strength to stress by the vibration of the turbine housing.

With a pair of ports adjacent to the converged portion having flanges connected with each other via a bridge portion having a slit, the thermal expansion and shrinkage of the pipe portions in an axial direction are absorbed, thereby preventing excessive load from being applied to bolts fixing the exhaust manifold to the engine case. Further, by setting thicker a V-shaped portion of the converged portion in which both pipe portions are connected to each other than the other portions, the V-shaped portion has enough mechanical strength to the thermal expansion and shrinkage of the pipe portions in their axial directions.

The turbine housing-integrated exhaust manifold of the present invention having the above structure is excellent in design from the aspect of mechanical strength, thereby being free from cracking and thus enjoying a long life. In addition, because of the structure integrally cast with a turbine housing for a turbocharger, the exhaust manifold can have a streamline shape for providing a smooth exhaust gas flow path even in a narrow space. Thus, it is possible to achieve to decrease a surface temperature of the exhaust manifold while improving the turbo performance. The turbine housing-integrated exhaust manifold of the present invention having such advantages can be used not only for diesel engines but also for gasoline engines.

What is claimed is:

1. An exhaust manifold integrally cast with a turbine housing for a turbocharger comprising:

pipe portions having exhaust gas flow paths and a plurality of ports adapted to receive an exhaust gas;

flanges respectively extending from said ports;

a converged portion connected to said pipe portions and adapted to converge the exhaust gas flow paths in said pipe portions; and a turbine housing integrally connected to said converged portion and having a circular exhaust gas flow path therein, wherein the exhaust gas flow path in said converged portion is in a tangent direction relative to the circular exhaust gas flow path in said turbine housing, wherein a neck portion connects an outer surface of said turbine housing to an outer surface of said converged portion, and wherein a ratio of r:L is 0.13 or more, r being a radius of curvature of said neck portion, and L being a distance in a tangent direction of said exhaust gas flow path from a center of said turbine housing to a centerline of said converged portion.

2. The exhaust manifold according to claim 1, wherein the ratio is 0.23 or more.

3. The exhaust manifold according to claim 1, further comprising:

ribs formed on outer surfaces of said pipe portions and said converged portion.

4. The exhaust manifold according to claim 1, wherein said turbine housing is disposed at a position deviated from a centerline connecting centers of said ports, and wherein said pipe portions are integrally connected to each other to form a V-shaped portion on a centerline side of said converged portion, the V-shaped portion has a wall portion that is thicker than other wall portions of said exhaust manifold.

5. The exhaust manifold according to claim 1, wherein said converged portion is provided on one side of said ports and said pipe portions are provide on an opposing side of said ports.

6. The exhaust manifold according to claim 1, wherein a pair of said ports located adjacent to said converged portion are surrounded by flanges having a bridge portion extending therebetween, and wherein said bridge portion has a slit of 3 mm or less in width extending substantially perpendicular to a centerline of said pipe portions.

7. The exhaust manifold according to claim 2, wherein said turbine housing is disposed at a position deviated from a centerline connecting centers of said ports, and wherein said pipe portions are integrally connected to each other to form a V-shaped portion on a centerline side of said converged portion, the V-shaped portion has a wall portion that is thicker than other wall portions of said exhaust manifold.

* * * * *